UNITED STATES PATENT OFFICE.

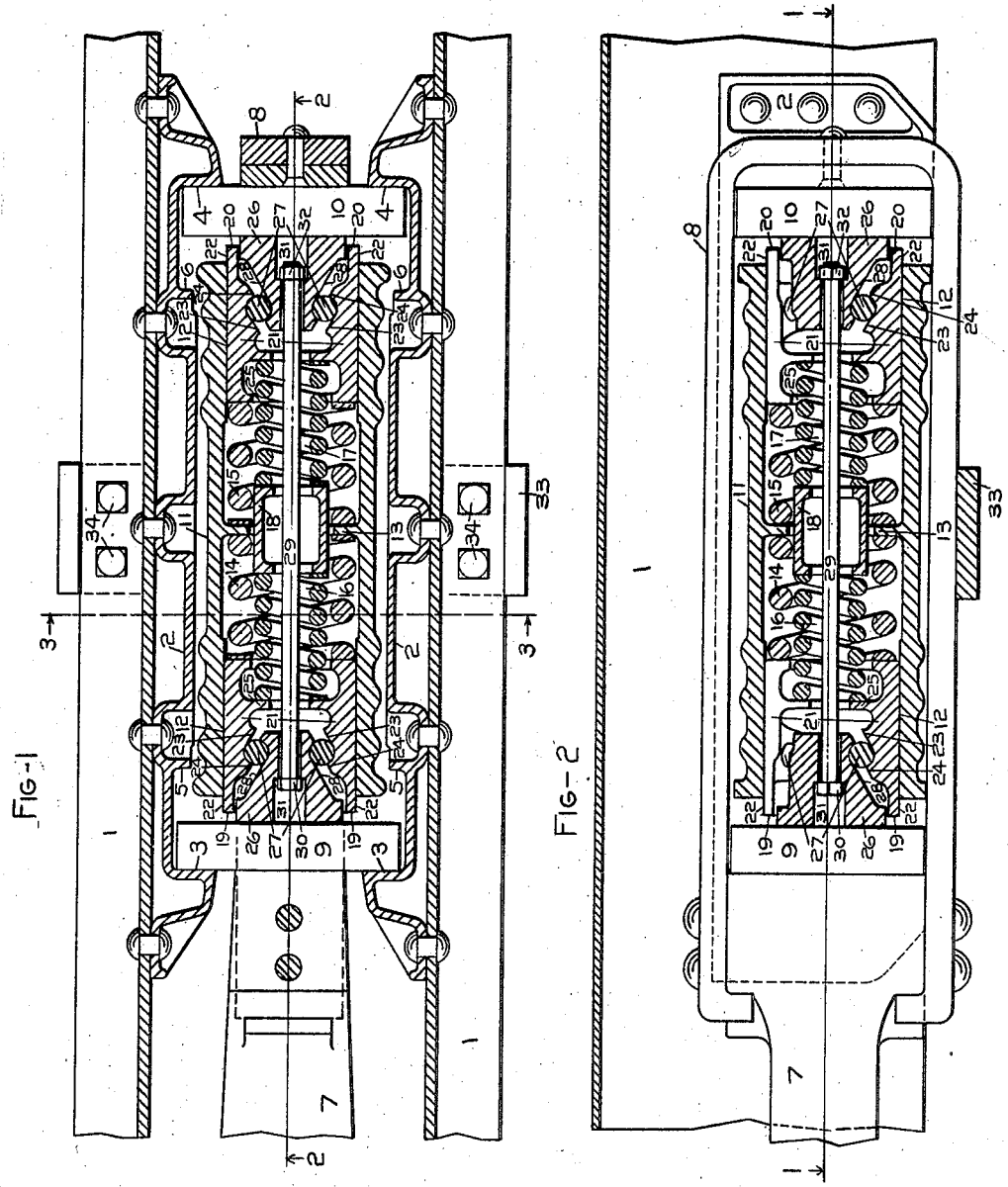

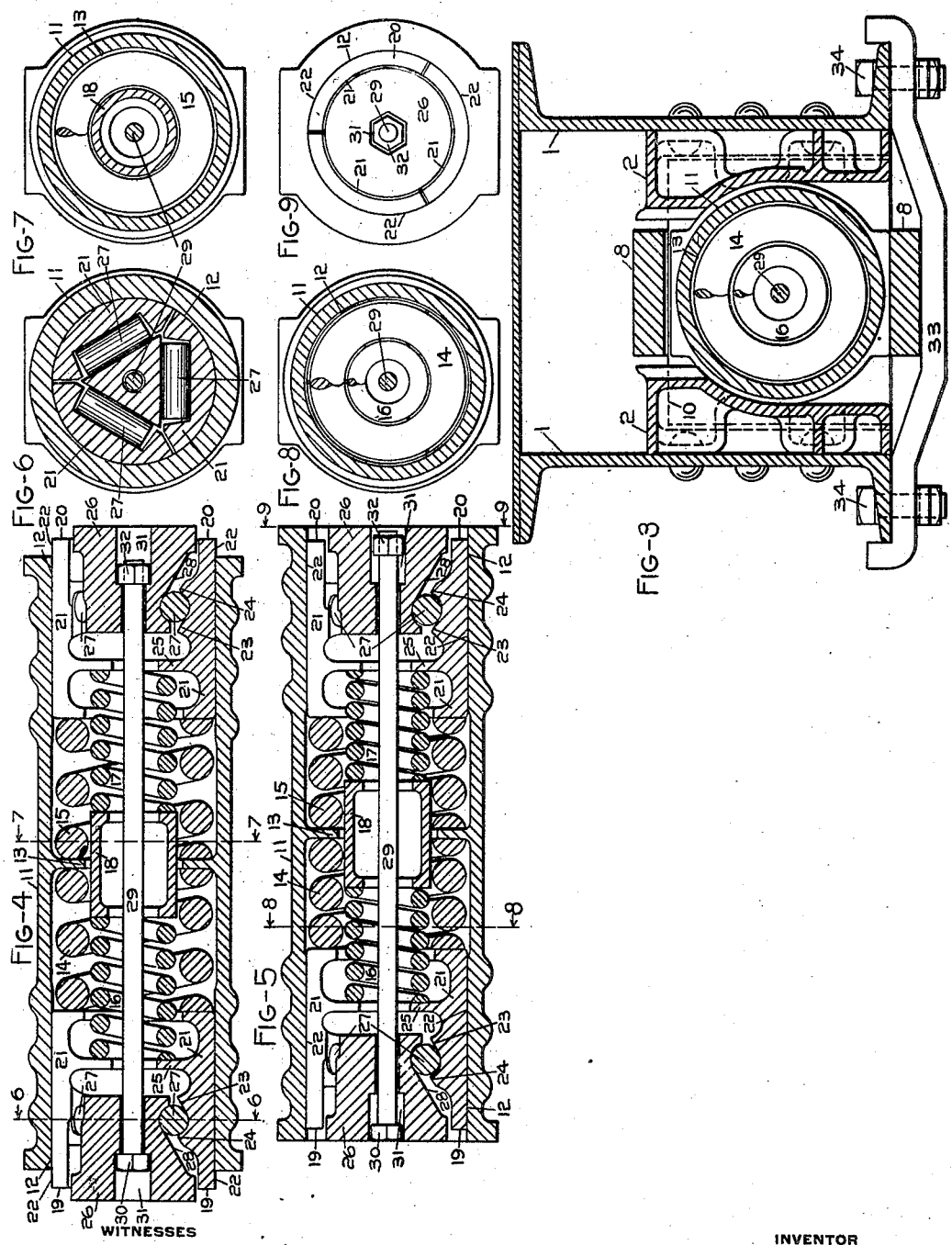

WILLIAM A. BERGER, OF CHICAGO, ILLINOIS, ASSIGNOR TO WILLIAM H. MINER, OF CHICAGO, ILLINOIS.

FRICTION DRAFT-RIGGING.

1,057,521.

Specification of Letters Patent.

Patented Apr. 1, 1913.

Application filed February 1, 1911. Serial No. 606,037.

*To all whom it may concern:*

Be it known that I, WILLIAM A. BERGER, a citizen of the United States, residing in Chicago, in the county of Cook and State of Illinois, have invented a new and useful Improvement in Friction Draft-Rigging, of which the following is a specification.

My invention relates to improvements in friction draft rigging for railway cars.

My invention consists in connection with the draw-bar, draft yoke, stop members and followers, of a friction shell or cylinder having internal friction faces at each end thereof and an internal abutment flange or shoulder at its middle for tandem arranged springs to abut against, in combination with two sets of friction shoes, one set at each end of the friction shell and two wedges, one for each set of friction shoes and two tandem arranged springs interposed between the two sets of friction shoes, and a connecting rod extending between the wedges to hold all the parts in assembled and operative relation with each other.

My invention also consists in the novel construction of parts and devices and in the novel combinations of parts and devices herein shown and described and more particularly specified in the claims.

In the accompanying drawing forming a part of this specification, Figure 1 is a plan view, partly in horizontal section, on line 1—1 of Fig. 2 of a friction draft rigging embodying my invention. Fig. 2 is a side elevation, partly in horizontal section on line 2—2 of Fig. 1. Fig. 3 is a cross section on line 3—3 of Fig. 1. Fig. 4 is a detail section of the friction shell and contained parts, showing the springs expanded. Fig. 5 is a similar view, showing the springs compressed. Figs. 6 and 7 are detail sections on lines 6—6 and 7—7 of Fig. 4. Fig. 8 is a detail section on line 8—8 of Fig. 5 and Fig. 9 is an end elevation looking from line 9—9 of Fig. 5.

In the drawing, 1, 1 represent the center sills or other draft members of a railway car, 2 the stop members secured thereto, having front and rear stops or shoulders 3, 4 for the followers to abut against, and limiting stops or shoulders 5, 6 to limit the compressive movement of the draw-bar and followers. 7 is the draw-bar, 8 the draft yoke, 9, 10 the followers, all these parts being of any ordinary, customary or suitable construction.

11 is my double acting friction shell or cylinder, the same having an internal friction face 12 at each end thereof. The friction shell 11 is also provided with an internal annular flange or shoulder 13 at its middle for the two tandem arranged springs 14, 15 to abut against at their adjacent ends. The smaller springs 16, 17 fit within the large or main springs 14, 15, and abut at their adjacent ends against a thimble or seat member 18 which is interposed between these springs 16, 17.

Inside the friction shell I provide two sets of friction shoes 19, 20, one at each end of the friction shell, and each set preferably consisting of three friction shoes 21, each of which has an external friction face 22 and an inclined or wedge face 23 and a shoulder 24. Each of the friction shoes 21 also has an internal flange or shoulder 25 for the end of the smaller or supplemental spring to abut against. Each set of friction shoes is outwardly spread against the friction shell by a wedge 26, anti-friction rollers 27 being interposed between each of the inclined or wedge faces 28 of the wedge and the corresponding friction shoe.

The two sets of friction shoes, the two wedges and the tandem arranged main and supplemental springs are all connected together and held and assembled in operative relation with each other by a connecting rod 29 having a head 30 at one end which fits in a recess 31 of one wedge and a threaded nut 32 which fits in the corresponding recess 31 of the other wedge, the connecting rod extending through the thimble or seat member 18 which is interposed between the smaller or supplemental springs 16, 17. The lower limb of the draft yoke rests upon the tie plate 33 which is removably secured by bolts 34 to the center sills or draft members 1, 1.

In operation, all the tandem arranged springs are compressed and both sets of friction shoes forced inward toward the middle of the shell in cushioning both pulling and buffing movements of the draw-bar. And in releasing, each of the springs reacts at one end against the friction shoes to restore the same to position. All the springs and both sets of friction shoes thus coöperate in both pulling and buffing and in both cushioning and releasing.

I claim:—

1. In a friction draft rigging, the combination with a draw-bar, draft yoke, stop members and followers, of a double acting friction shell having an internal friction face at each end thereof, two sets of friction shoes, one set at each end of said friction shell, two wedges, one for each set of friction shoes, and springs interposed between the two sets of friction shoes, said friction shell having an internal shoulder at the middle for the adjacent ends of the springs to abut against, substantially as specified.

2. In a friction draft rigging, the combination with a draw-bar, draft yoke, stop members and followers, of a double acting friction shell having an internal friction face at each end thereof, two sets of friction shoes, one set at each end of said friction shell, two wedges, one for each set of friction shoes, springs interposed between the two sets of friction shoes, said friction shell having an internal shoulder at the middle for the adjacent ends of the springs to abut against, and a pair of tandem arranged smaller springs within said first mentioned springs and a seat member interposed between the adjacent ends of said smaller springs, substantially as specified.

WILLIAM A. BERGER.

Witnesses:
ALENE F. CHATMAN,
KEITH M. JEFFREY.

Copies of this patent may be obtained for five cents each, by addressing the "Commissioner of Patents, Washington, D. C."